(12) United States Patent
Gilbert et al.

(10) Patent No.: US 8,161,525 B2
(45) Date of Patent: Apr. 17, 2012

(54) METHOD AND SYSTEM FOR ARCHITECTING A SECURE SOLUTION

(75) Inventors: Arthur Miles Gilbert, Bethel, CT (US); James J. Whitmore, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 11/755,529

(22) Filed: May 30, 2007

(65) Prior Publication Data

US 2007/0266437 A1    Nov. 15, 2007

Related U.S. Application Data

(62) Division of application No. 09/838,749, filed on Apr. 19, 2001, now Pat. No. 7,251,831.

(51) Int. Cl.
*H04L 29/06* (2006.01)

(52) U.S. Cl. ............................................. 726/2; 713/166

(58) Field of Classification Search .................. 726/2, 6, 726/14, 18, 19, 27; 717/101, 106, 120; 713/166
See application file for complete search history.

(56) References Cited

U.S. PATENT DOCUMENTS

| | | | |
|---|---|---|---|
| 4,672,572 A * | 6/1987 | Alsberg | 726/11 |
| 5,421,006 A | 5/1995 | Jablon et al. | |
| 5,519,778 A | 5/1996 | Leighton et al. | |
| 6,405,364 B1 * | 6/2002 | Bowman-Amuah | 717/101 |
| 6,550,057 B1 * | 4/2003 | Bowman-Amuah | 717/126 |
| 6,671,809 B1 | 12/2003 | Perona et al. | |

* cited by examiner

*Primary Examiner* — Kimyen Vu
*Assistant Examiner* — Leynna Truvan
(74) *Attorney, Agent, or Firm* — Ojanen Law Offices; Karuna Ojanen; William Schiesser (57) ABSTRACT

A system and method of designing a secure solution which meets the needs of a customer but which is appropriate and repeatable and may use components which are insecure or not trusted. In its preferred embodiment, the security system includes subsystems selected from access control, information flow, identity and credentials management, integrity and assurance. In each subsystem, elements are employed to reduce the effect of perils and to provide a repeatable system design.

13 Claims, 10 Drawing Sheets

IT Security processes and subsystems

Integrity Subsystem processes

Fig. 6

Access Control Subsystem processes

Fig. 7

Information Flow Control Subsystem processes

Fig. 8

Credential Subsystem processes

Fig. 9

Sample PKI Digital Certificate Enrollment Process Flow

Fig. 10

METHOD AND SYSTEM FOR ARCHITECTING A SECURE SOLUTION

CROSS-REFERENCE TO RELATED PATENTS

This application is a divisional under 35 U.S.C. §120 of U.S. Ser. No. 09/838,749 entitled METHOD AND SYSTEM FOR ARCHITECTING A SECURE SOLUTION, filed on 19 Apr. 2001, now U.S. Pat. No. 7,251,831 which is hereby incorporated by reference in its entirety.

The present invention is related to the following documents, all of which are assigned to the assignee of the present invention and which are specifically incorporated herein by reference:

Patent application Ser. No. 09/625,108 filed Jul. 25, 2000 by Steven D. Barnes et al. and entitled "Method and System for System Integration", a document which is sometimes referred to in this document as the SI Patent.

Patent application Ser. No. 09/506,260 filed Feb. 17, 2000 by Brenda Barth-Harvey et al. and entitled "Automated Management Process for Enterprise Resource Planning System Implementation", a document which is sometimes referred to in this document as the Management Process Patent.

Ser. No. 09/660,852 filed Sep. 13, 20000 by G. Vahee et al. and entitled "Project Management Method and System", a patent which is sometimes called the Worldwide Process Management Method Patent (which may be shortened to the WWPMM Patent).

BACKGROUND OF THE INVENTION

1. Field of the Invention

The present invention relates to techniques for designing a secure solution within an information technology system. More particularly, the present invention includes an improved system and method for designing security into the solution as it is being created rather than adding it on to a completed design. The present invention includes use of a set of baseline security requirements to assist in designing a secure solution.

2. Background Art

The description of the present invention which follows is based on a presupposition that the reader has a basic knowledge of information technology (sometimes referred to as data processing) systems and the processes of designing and developing solutions within an information technology function. Some of these processes are described in the SI Patent, the Management Process Patent and the WWPMM Patent referenced above.

Such a solution design process inherently involves consideration of security. Any application is subject to undesirable alteration as a result of a number of factors—deliberate hacking or attempts by those with no good motives to change the solution or make it inaccessible or ineffective for its intended purpose, attempts by well-meaning but unauthorized people to improve on the operation of the programs and accidental access by those who have no intention of making changes but nevertheless may be able to make changes in the program.

Designing applications or solutions for security is somewhat difficult because there is a lack of baseline requirements. Thus, it becomes difficult to develop information technology solutions which effectively and consistently apply security principles when there is a lack of agreement on security requirements for such a system.

There is also a lack of industry-accepted security design methods. This again contributes to solutions which do not effectively and consistently apply security requirements.

Applications have become quite complex, sometimes using a plurality of different component architectures and using diverse systems for integrating such applications together. These complexities make security more difficult.

The authors of *Trust in Cyberspace* explain the security challenge faced by today's designers of applications in terms of deriving a trusted networked information system (NIS) from the integration of untrustworthy components.

A second aspect of security design problems is apparent from newspapers, periodicals and texts. Those who seek to corrupt or to interfere with the correct and reliable operation of networked information systems have a structured approach to achieving their objective whereas the architects who seek to design trustworthy solutions rely largely on individualized approaches.

The effectiveness of security measures in computing solutions can be handicapped by component limitations, by miscommunicated or misinterpreted requirements or by narrowly focused application of security technology.

Eberhardt Rechtin in *Systems Architecting* has described the complexity of balancing tradeoffs between access, privacy and security in information technology solutions. That is, a system should be protected from allowing unauthorized access to information while allowing easy access for authorized access and information should be maintained in private against unauthorized access while allowing easy access to that information for authorized purposes. Rechtin suggests an approach for developing an architecture, differentiating between the system (what is built), the model (a system to be built), a system architecture (structure of the system), the overall architecture (an inclusive set of the system architecture, its function, the environment in which is will exist) and the process used to build and operate it. Rechtin further outlines steps for creating a system model as aggregating closely related functions; partitioning or reducing the model into its parts; and fitting or integration of components and subsystems together into a functioning system.

It should be realized that, in today's environment of networked information systems, security functions are, at best, only partially centralized. As components of an information system or solution are distributed, then security also must be distributed.

Effective security design is sometimes impeded by the fact that in many solutions security mechanisms are imbedded in technologies and distributed among different functions and components within operating systems, network components, application programs, database and transaction subsystems and other components. Thus, security may be an element of all these components, but it is a responsibility of none.

While the formalization of security evaluation criteria into an international standard known as Common Criteria has reduced one of the barriers to a common approach to developing extensible information technology security architectures, Common Criteria does not provide techniques to arrive at comprehensive security designs in a consistent manner. These Common Criteria have been documented in a series of documents which provide detailed security evaluation criteria and have been submitted to the International Standards Organization and been given the designation ISO 15408. These Common Criteria provide a framework for the specification of secure products in terms of standard protection profiles and independently selected the evaluation assurance level from a defined set of seven increasing levels of assurance. These Common Criteria introduce a set of terminology including Target of Evaluation or TOE, the component under design;

TOE Security Policies or TSP and TOE Security Functions or TSF, which is that portion of the TOE which is responsible for security.

The Common Criteria includes 11 Functional Classes (e.g., Security Audit, Communication, Cryptographic Support, . . . ), 66 Class Families with each class including a number of component criteria. Since these Common Criteria are a basis for understanding security functions, the Common Criteria and ISO 15408 are hereby specifically incorporated herein by reference.

While the Common Criteria provide a "best practice" for specifying security functions and are used by some designers of solutions and security related components, the allocation of Common Criteria functional requirement among the components of a solution is not intuitive or simple to implement. The classes and families in the Common Criteria represent an aggregation of requirement but this is more reflective of abstract security themes rather than being reflective of security in the context of an information technology solution.

Past security solutions have been largely limited to addressing specific vulnerabilities via countermeasures within point solutions such as applying network and systems management processes, hardening operating systems and publicly available servers, applying and monitoring intrusion detection systems and configuring and operating digital certificate servers. In addition, firewalls have been installed and configured to prevent inappropriate access to systems. But, each of these security solutions addressed only specific ways in which a system may be vulnerable and, while desirable, does not assess or solve the problem of system wide security in a systematic approach.

There have been several attempts to organize a security design process without regard to subsystems or components. These are in Sections 10.1-10.2 of ISO/IEC PDTR 15446 entitled "Information Security Techniques Guide for the Production of Protection Profiles and Security Target which is found at http://csrc.nist.gov/cc/t4/wg3/27n2449.pdf and a tool funded by the US government and made publicly available called CCTOOL which may be found at http://naip.nist.gov/tools/cctool.html. These attempts generally fall short of the desired level of consistent security, independent of the components and subsystems.

The lack of a common set of criteria to test and evaluate security requirements (despite the existence of the Common Criteria) was also highlighted in a recent article in *Computerworld* magazine entitled "Common Ground Sought on IT Security Requirements", which article has been posted on the Internet and is presently available at the following address: http://www.computerworld.com/cwi/story/0,1199, NAV47_STO58497,00.html. This *Computerworld* article reports a meeting of government security experts and private sector IT vendors held recently. While the attendees agreed that a common set of criteria is needed to help test and evaluate the security of commercial IT products, there was no agreement how to accomplish that object, much less an approach to testing a system which might indicate diverse products from different vendors. This meeting was called the first Government-Industry Security Forum and was sponsored by the National Information Assurance Partnership (NIAP).

Thus, the prior art systems for providing security in information technology solutions have undesirable disadvantages and limitations which impact the effectiveness of the assessments and limit the scope of recommendations for improvements.

SUMMARY OF THE INVENTION

The present invention overcomes the disadvantages and limitations of the prior art systems by providing a simple, yet effective, way of designing security into an information technology system.

The present invention has the advantage that it provides a security design method to simply, yet effectively, allow the design of business solutions and security solutions which are based on sound security principles and effective security measures.

The present invention also has the advantage that it allows security architectures to be integrated within the components and architectures found in an enterprise. This invention accommodates and facilitates the inclusion of security in e-business solutions, although it is by no means limited to such solutions.

The present invention uses a set of baseline requirements for security and a security design method to achieve a simple, yet repeatable method and system for designing a solution with integrated security.

The present invention also includes a variety of baseline tools and procedures. However, since the tools of the present invention are not mutually exclusive, they allow for the mixing and matching. Under some circumstances, some of the tools may be used without the corresponding use of other tools.

The present invention has the advantage that it focuses on the security of the entire solution (and risks of attack) and does not focus on the security of a single element or component.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which:

FIG. 4-8 are detailed illustration of each of the subsystems which are shown in FIG. 3, in which:

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
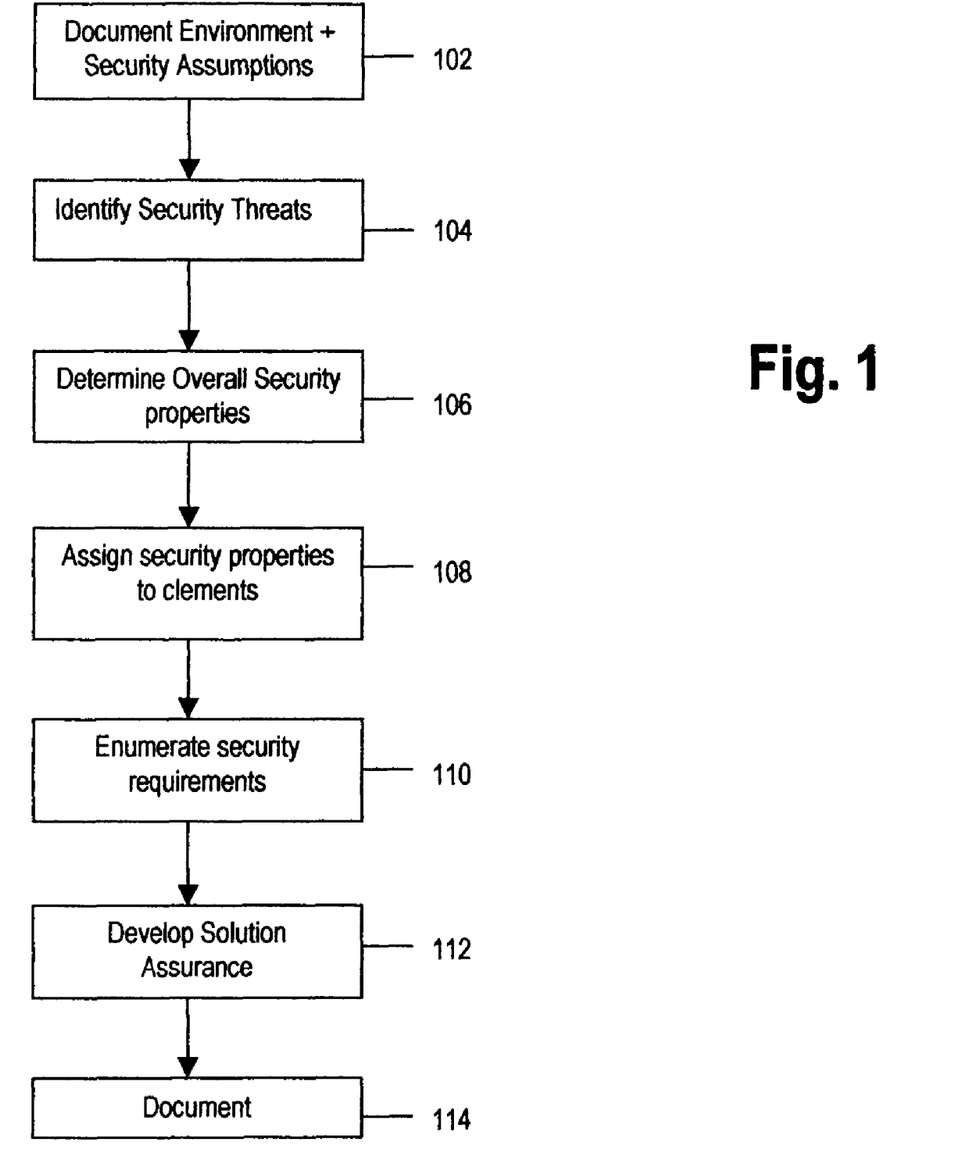
FIG. 1 is a flow chart illustrating one embodiment of the system and method of architecting a secure solution of the present invention.

FIG. 1 shows the process used in the present invention for architecting a secure solution. This method and system for architecting a secure solution starts at block 102 with documenting the solution environment and security assumptions. This step of documenting the environment and the assumptions may be accomplished by using the Solution Design Activity from the IT Security Methodology or any similar set of design tools. Next, the security threats are identified, documented and ranked for the solution environment under consideration at block 104. That is, the various threats to the proper operation of the solution are considered (for example, using the normal and peril operation models described in connection with FIG. 2 below) and the risks of attack and the possible impact are considered. For example, some portions of the solution may be valuable as a whole but worth little in its component parts (e.g., a dictionary) and other component parts may be very valuable by themselves (for example, the account records for a single banking customer). In some cases, "read" access to information may be publicly available but only selected representatives will have "write" access to the information (for example, the price list for products in a catalog).

Figure 3:
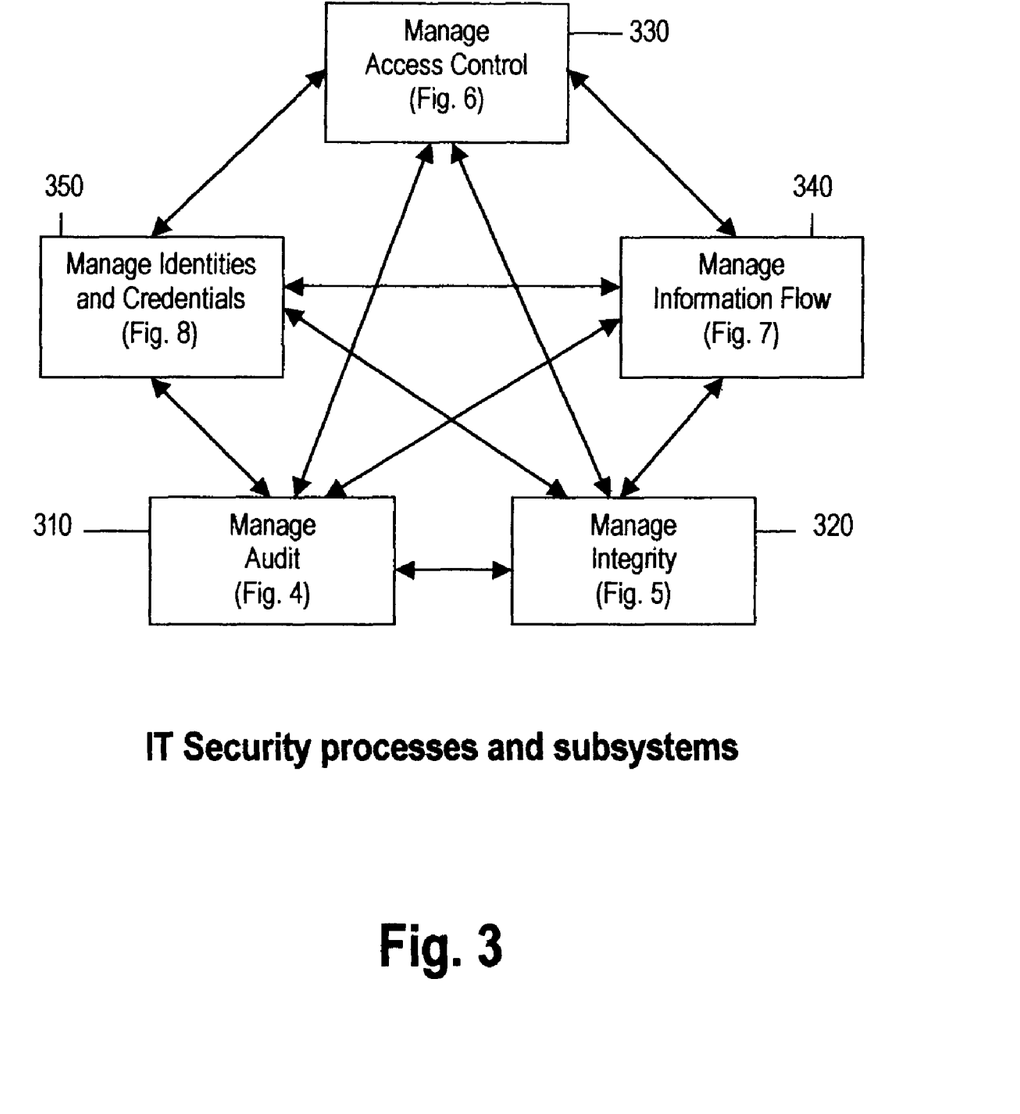
FIG. 3 is an illustration of different subsystems related to security useful in the present invention, illustrating the interaction of the subsystems.

Next, at block 106, the security properties of the overall solution are determined in terms of the security subsystems identified in FIG. 3 and represented in FIGS. 4-8 using the Solution Outline Activities. Then, at block 108 functional details of the security subsystems are assigned to various elements of the solution, including infrastructure, components and operations, using the SI Method Macro Design Activities. Following this step, at block 110 the security requirements for the solution are enumerated for each of the infrastructure, components and operations using the Common Criteria. The Common Criteria are also used at block 112 to develop assurance requirements for the solution. Finally, then, at block 114 the entire process is documented, by creating functional technology diagram(s) and documenting the requirements, rationale and guidance for component selection and systems integration and solution operation using Solution Design Activities from the SI Method as described in the SI Patent referenced above.

Figure 2:
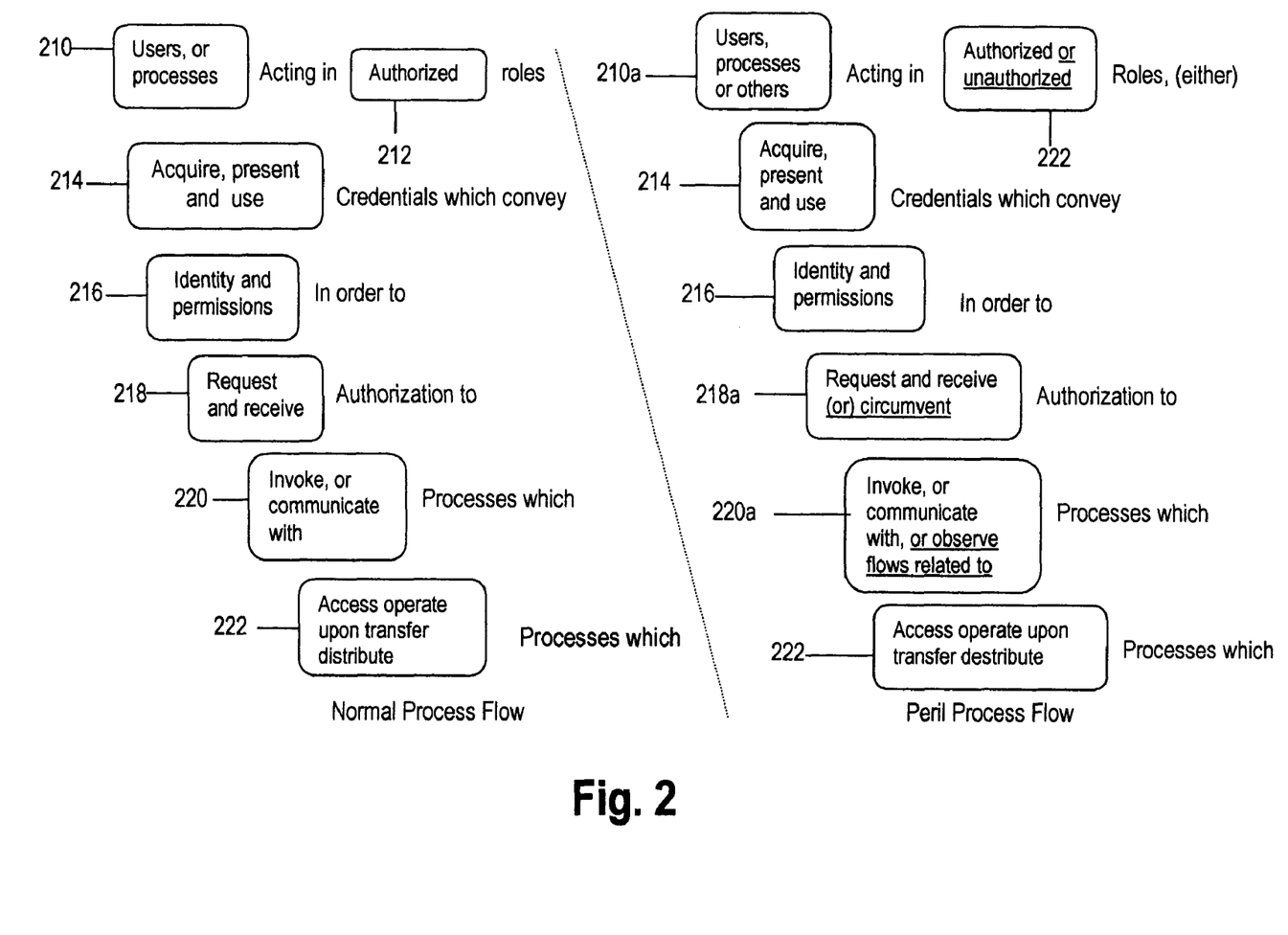
FIG. 2 is an illustration of different aspects of business process flow in a solution and the uses and misuses of it in an effort to show the normal and peril operations of the business process.

FIG. 2 is a chart which illustrates generalized information technology process flows in which information assets may be acted upon by a process invoked by a user or by a process acting on behalf of a user: a normal business process flow at the left (which may occur within a trusted environment) and a peril business process flow at the right for comparison and contrast (this peril process flow represents elements of the normal business process flow with the addition of conditions or exceptions associated with security perils). This FIG. 2 illustrates that there are the many different forms of peril which may be present in an information technology (IT) solution. So, the normal business process flow is that users or processes (block 210) acting in authorized roles (block 212) acquire, present and/or use (block 214) credentials which convey identity and/or permissions (block 216) in order to request and/or receive (block 218) authorization to invoke or communicate with (block 220) processes which access, operate upon, transfer and/or distribute (block 222) information assets. In contrast, in a peril or unauthorized mode, someone other than users and processes (block 210a) may be acting in either authorized or unauthorized roles (block 212a) leading to the flowing types of risks: in block 210a, that something other than a user or a process may be acting on the system, which presumably would include tapping into data through a snooping device and that users or processes might be acting in unauthorized roles—such as accessing resources which are not authorized for that user or that process. In the peril mode, the blocks 214 and 216 are the same, where credentials are acquired, presented and/or used which convey identity and/or permissions. At block 218a, the purpose of this activity may be to not only request and/or receive authorization (as in the normal mode) but also (in the peril mode) to circumvent authorizations and in block 220a, in the peril mode, the purpose may additionally be to observe flows relating to the accessing, operating upon, transferring or distributing information assets. The observing may be for a copy of the information itself (information which may not be appropriate for that user or process) or for defeating the security of the system at a later time.

FIG. 3 illustrates representative components of an IT Security processes and subsystems which are described individually in detail later in connection with FIG. 4-8. These subsystems are an audit subsystem 310, an integrity subsystem 320, an access control subsystem 330, an information flow management subsystem 340 and an identity and credentials subsystem 350. The interconnection and interoperation of these systems is shown, with the effect that each of the subsystems is connected to and influences the other subsystem to provide a single integrated security system of the present invention. The audit subsystem 310 is shown and described in greater detail below in connection with FIG. 4, the integrity subsystem 320 is described in greater detail in connection with FIG. 5 and the access control subsystem 330 is shown and described in detail in connection with FIG. 6 below. The information flow management system 340 is shown in detail and described in connection with FIG. 7 and the identity and credentials subsystem 350 is shown and described in connection with FIG. 8. Many elements of the various subsystems are either self-explanatory or similar from one subsystem to the next and will not be discussed in detail in connection with the various subsystems.

Figure 4:
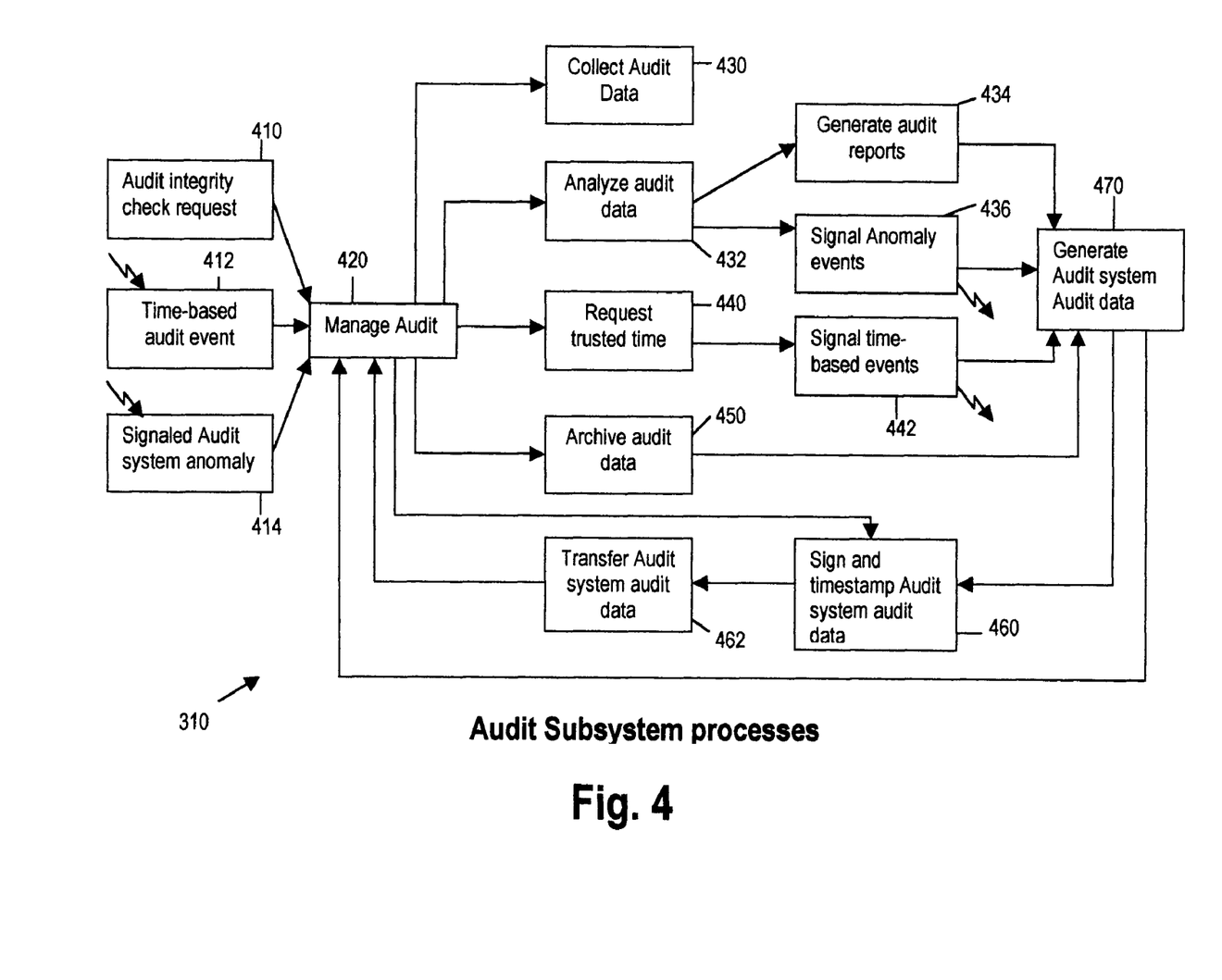
FIG. 4 is an block diagram illustration of an Audit Subsystem and its processes, the first subsystem component of the security system of FIG. 3.

A representative version of the audit subsystem 310 is shown in some detail in FIG. 4. An audit is initiated in one of three ways: by an audit integrity check request 410, by a time-based audit event (an audit set by a clock to perform an audit at a predetermined time interval) 412 or in response to a detected audit signal anomaly 414. In any event, an audit is managed at block 420 which performs the following functions: collect audit data at block 430, analyze audit data at block 432, request trusted time at block 440, archive audit data at block 450 and sign and timestamp audit data at block 460. The process of analyzing audit data in block 432 includes generating audit reports at block 434 and signal anomaly events at block 436. The request trusted time at block 440 is used to signal time-based events at block 442 (like initiating a time-based audit event at block 412).

Figure 5:
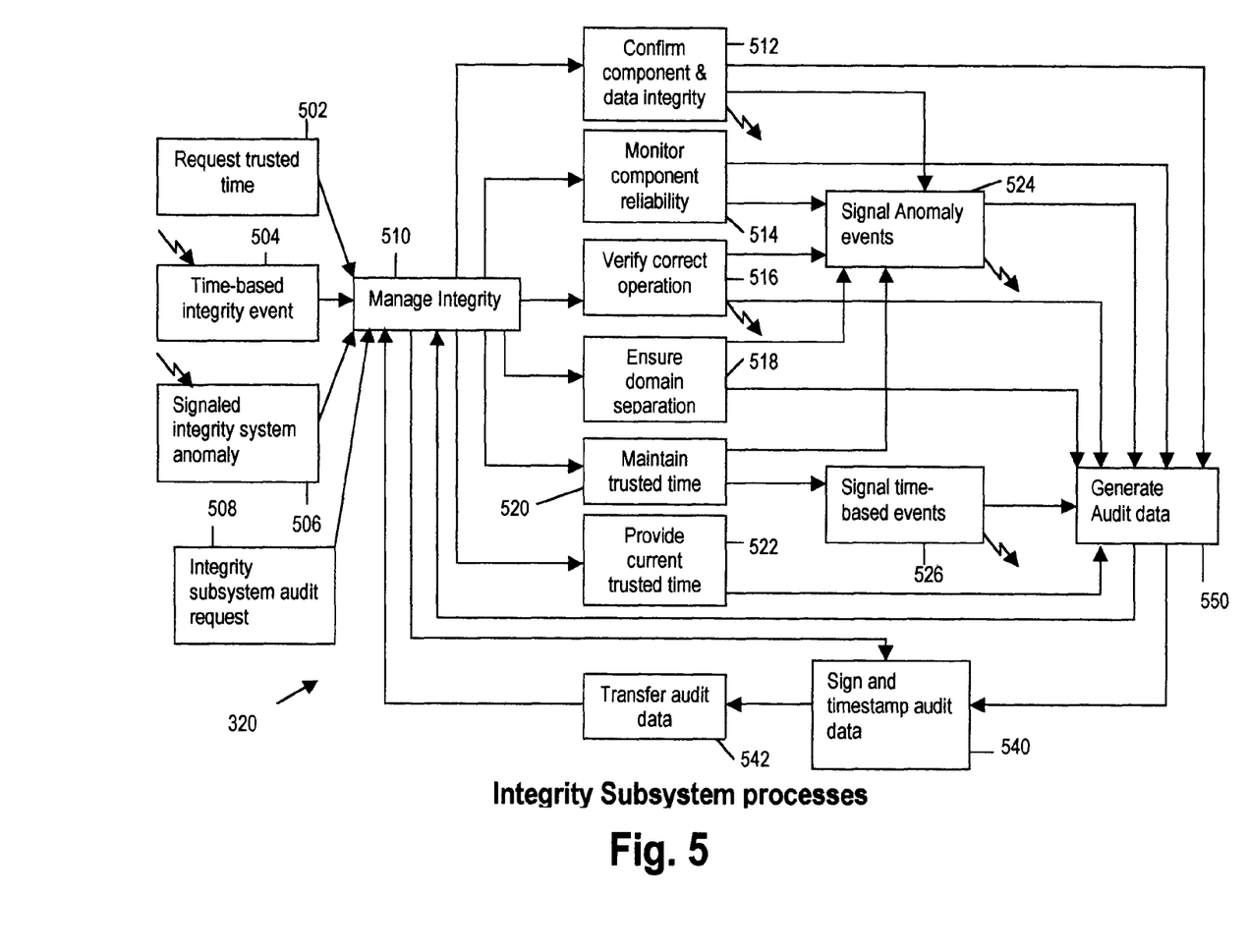
FIG. 5 is a block diagram illustration of an Integrity Subsystem and its processes, the second subsystem component of the security system of FIG. 3.

A representative version of an integrity subsystem 320 is shown in some detail in FIG. 5. The integrity subsystem 320 includes an input 502 at which a trusted time is requested, an input 504 where a time-based integrity event is used, a signaled integrity system anomaly 506 and an integrity subsystem audit request 508 which are inputs to a function to manage integrity 510. From the block 510 where integrity is managed, the subsystem includes an element represented by block 512 to confirm component and data integrity, and element 514 to monitor component reliability, an element 516 to verify correct operation, an element 518 to ensure domain separation, a clock 520 to maintain trusted time and a clock to provide current trusted time 522. A signal 524 for anomaly events is coupled to the elements 514, 516 and 518 as well as the clock 520. A signal for time-based events is coupled to the clock 520 for maintaining a trusted time and allows an integrity check to be programmed into the system to occur at predetermined time intervals, while using the trusted time avoids any change in a clock from circumventing the integrity checks. A block 540 coupled to the integrity managing function 510 signs and timestamps integrity audit data and it is transferred at block 542. The signals 524, 526 for anomaly events and the time-based events, respectively, are coupled to a block 550 for generating and recording audit data related to the integrity function of the present subsystem 320.

Figure 6:
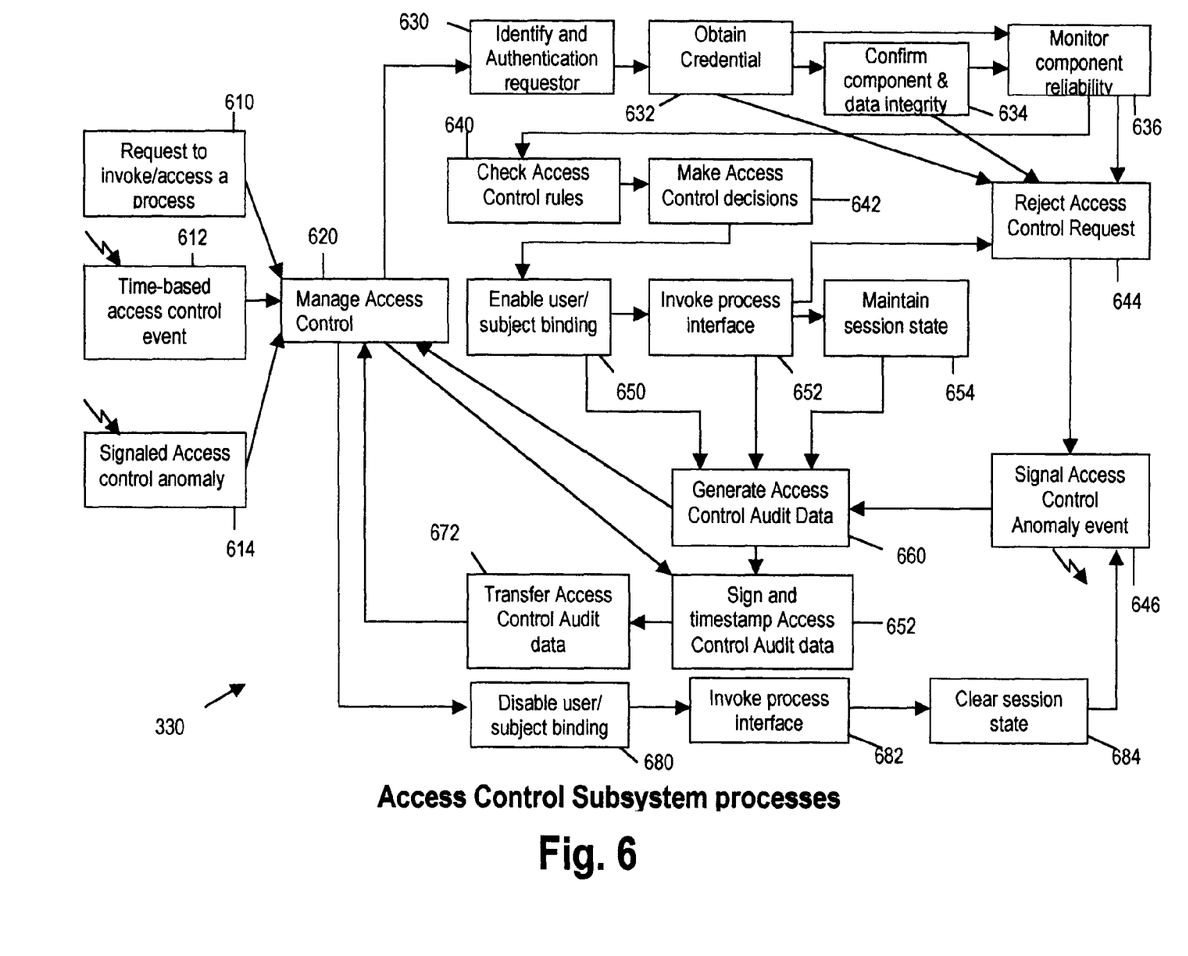
FIG. 6 is an block diagram illustration of an Access Control Subsystem and its processes, the third subsystem component of the security system of FIG. 3.

A representative version of an access control subsystem 330 is shown in some detail in FIG. 6. Access control is initiated by either a request to invoke or access a process at block 610, a time-based access control event at block 612 or a signaled access control anomaly at block 614. Based on these inputs, then the subsystem manages access control at block 620, including identifying and authenticating requester at block 630, obtaining credentials for the requester at block 632, verifying secrets at block 634 and checking credential status at block 636. At block 640, the access control rules are checked and at block 642 access control decisions are made— either to reject the requested access at block at block 644 or to enable access by enabling user/subject binding at block 650, invoking the process interface at block 652 and maintaining (or, in some cases, establishing) a session state at block 654. Note that rejecting access control at block 644 may also occur because of a failure to obtain credentials at block 632, a failure to verify secrets (such as a password) at block 634 or a failure of the credential check at block 636. Access control audit data is generated at block 660 once the user/subject has been enabled at block 650 and the process interface invoked at block 652 and as a result of the session state at block 654. Block 646 indicating an access control anomaly event may result from rejecting access in block 644 and is coupled to the access control audit data block 660 to log a rejection of attempted access. The access control block 620 and the audit data block are coupled to block 670 where the audit data is signed and timestamped and transferred at block 672. Also as a result of access control block 610, disabling user/subject binding may result at block 680 (either as a result of a logout or as a result of expiration of a preset time period without activity) and that may invoke the process interface at block 682 and clearing of the session state at block 684.

Figure 7:
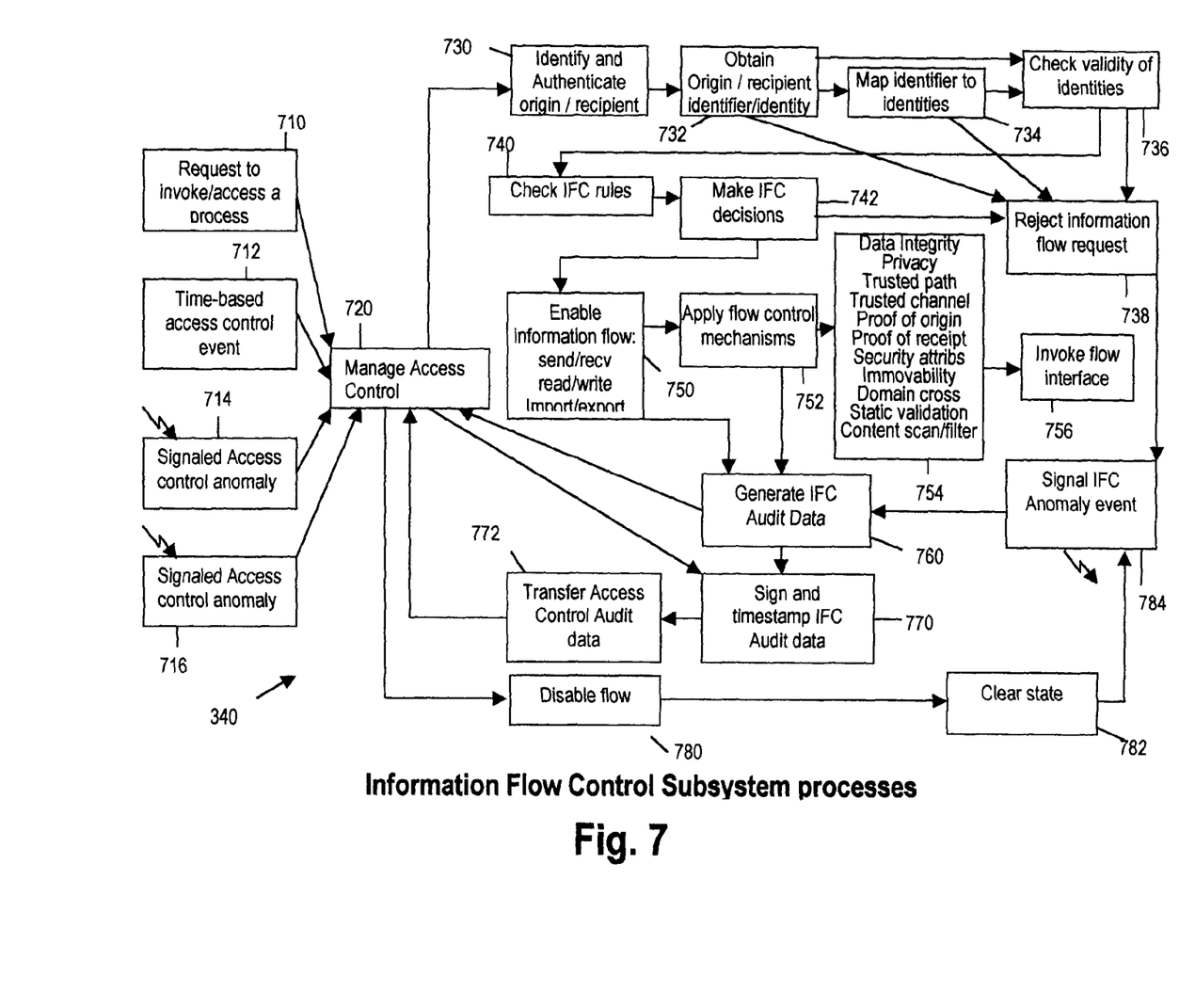
FIG. 7 is an block diagram illustration of an Information Flow Control Subsystem and its processes, the fourth subsystem component of the security system of FIG. 3

An illustrative version of an information control subsystem 340 is shown in detail in FIG. 7. The information flow subsystem 340 is invoked, similar to the other subsystems like the audit subsystem of FIG. 4, by one of several inputs, 710, 712, 714 and 716. The function of managing information flow is performed by block 720, the function of identify and authenticate origin/recipient is performed by block 730 and the function of obtaining an identifier or identity of the origin/recipient by block 732. Then, at block 734 identifiers are mapped to the identities, allowing an alias to be used for communication, if desired. At block 736 the validity of identities is checked with stored information and the identity is either proper for the activity in which case control passes to block 740 (where the stored information flow rules are checked) or improper in which case the information flow request is rejected at block 738. Block 742 is where information flow decisions are made, based on the rules and the identities of the origin or recipient. If the information flow is rejected, control passes to block 738, if it is enabled, it passes to block 750 were information flow is enabled and at block 752 any flow control mechanisms are applied. At block 754 the various types of information flow and protections activities occur as listed in the block, then at block 756 a flow interface is invokes and audit data is generated at block 760.

If the information flow is rejected at block 738, then an anomaly event is signaled at block 784 and the state is cleared at block 782 and flow is disabled at block 780.

Figure 8:
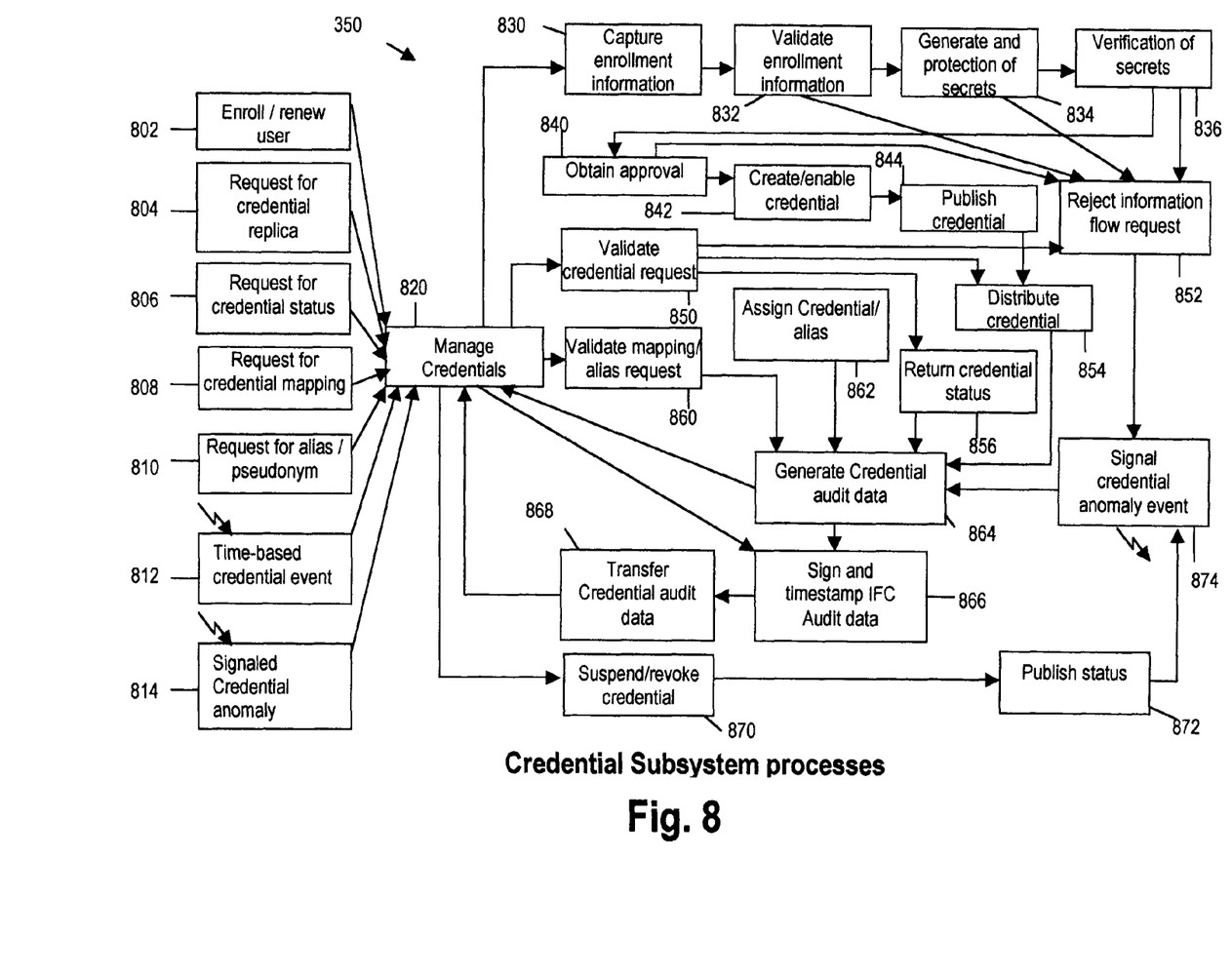
FIG. 8 is an block diagram illustration of a Credential Subsystem and its processes, the fifth subsystem component of the security system of FIG. 3.

A version of a credential subsystem 350 is shown in FIG. 8 to illustrate representative components useful in understanding the present invention. The several ways to invoke this subsystem are identified by blocks 802, 804, 806, 808, 810, 812 and 814, including a request for enrollment of a new user and the request for credentials or an alias. As a result of checking enrollment information at block 832, generating and protecting secrets at block 834 and verification of secrets at block 836, a request may either be approved using block 840 or rejected using block 852. If approved, credentials are created or obtained, published and distributed through blocks 842, 844 and 854, respectively. Similar steps are used for an alias request.

Figure 9:
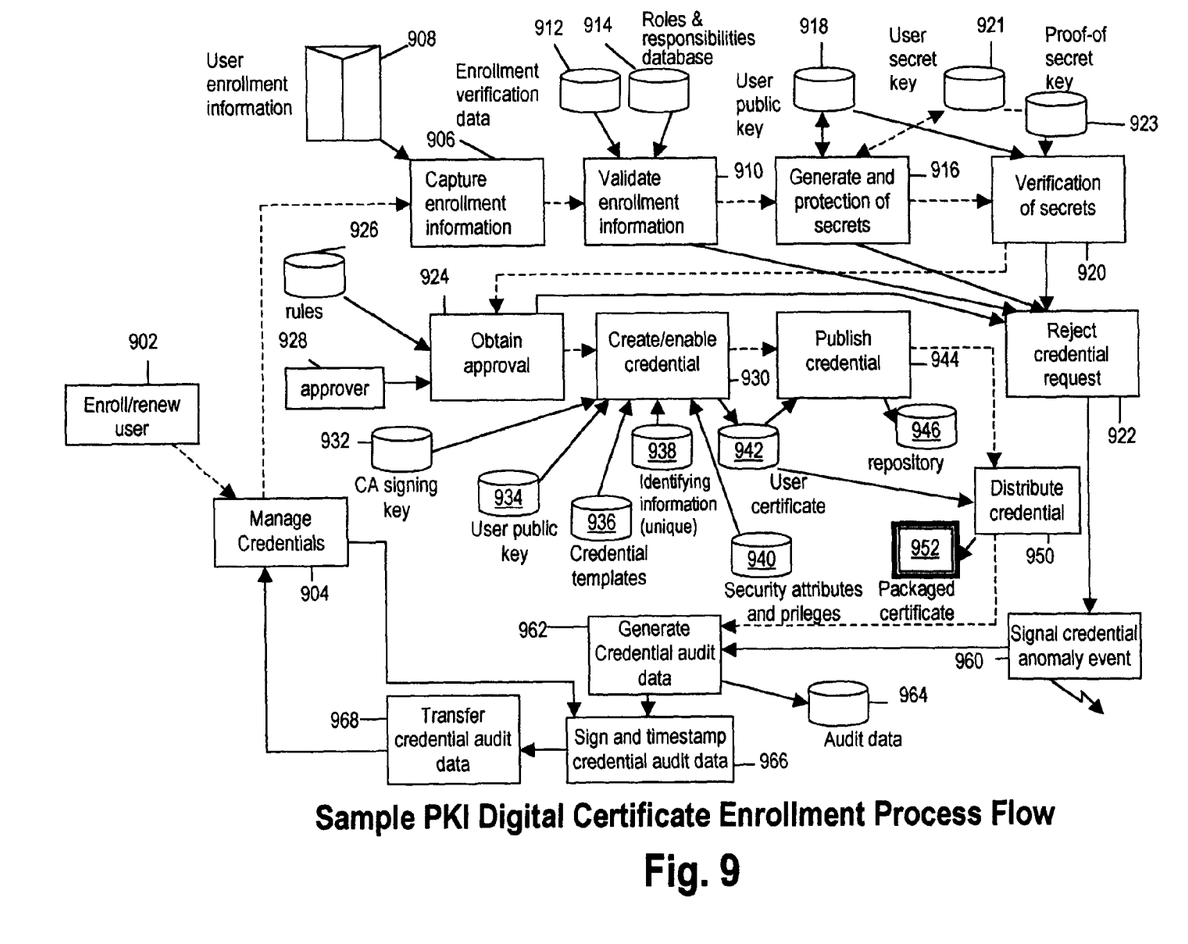
FIG. 9 is a sample enrollment process in a public key system.

A sample of a public key identification certificate enrollment process flow and system is shown in FIG. 9 which uses some of the subsystems of the present invention. When a user seeks to enroll or renew at block 902, the process of managing credentials is employed at block 904, including capturing user enrollment information 908. Next, the enrollment information is validated at 910, using enrollment verification information 912 and roles and responsibilities database 914. At block 916 the process of generating and protecting secrets happens with bi-directional flows with the user public key database 918 and the secret key database 922. Verification of the secrets (including the secret key) occurs at block 920, using the secret key database 922 and a proof of secret key 924. Using a rules database 926 and/or an approver 928, the approval for the user is obtained at block 924 and credentials are created and/or enabled at block 930 involving a signing key 932, a user public key 934, credentials template(s) 936, unique identifying information (such as biometric information) database 938 and security attributes and privileges 940, generating a user certificate which is stored in database 942 and published at block 944 into a repository 946. At block 950, the credentials are distributed, sometimes in the form of a packaged certificate 952 and credential audit data is generated at block 962, stored at database 964 and signed and timestamped at block 966.

If credentials are determined not appropriate during the process, the request is rejected at block 922, an anomaly event is signaled at block 960 and audit data is created at block 962.

Figure 10:
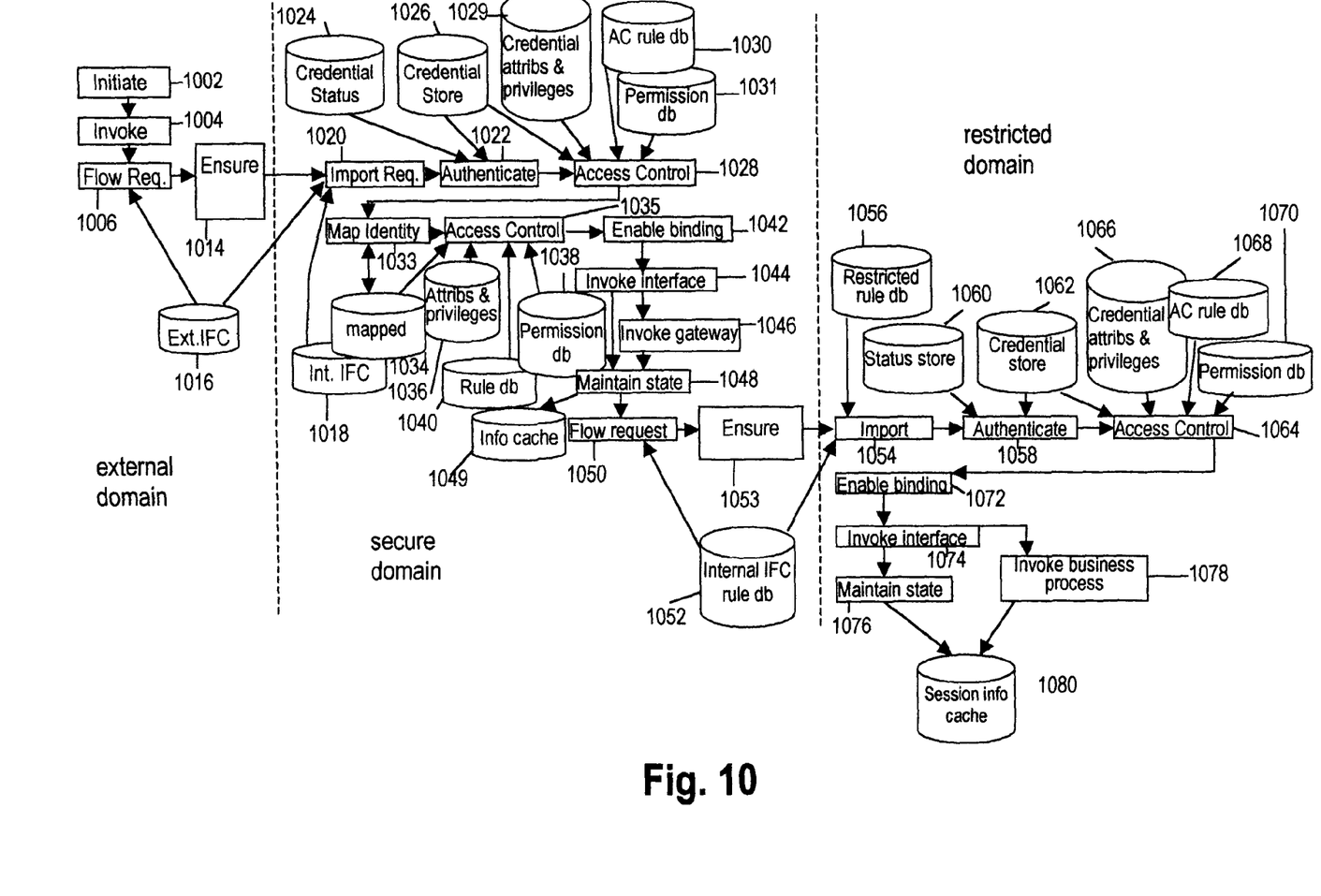
FIG. 10 is an illustrative process flow illustrating how various security subsystems operate together to achieve security of the combined system in the present invention in an input flow for a typical client/server process using enterprise computing with an Internet environment.

FIG. 10 illustrates an input flow for a three-tier client server process which is typical of the integration of enterprise computing with a network environment such as the Internet. As shown by the dotted line divisions in FIG. 10, the three tiers are an external domain (at the left), a secure domain (in the center) and a restricted domain (at the right). As will be described in connection with this FIG. 10, the processes of the credential, access control and information control subsystems are spread through the three domains (but, for simplicity, the present example does not include any audit or integrity subsystems, although these could be added, if desired, to the environment, based on the foregoing explanation of these subsystems.

At block 1002 a business function is invoked by a user (a person) or process (such as another application). Access control is used to invoke the business process interface at block 1004 if the user or the process is authorized to invoke the requested business function (some of which may be available to all and other functions may be limited to select users or processes). Once the business process interface has been invoked at block 1004 by an authorized user or process, then the request flows across the external domain in a manner which is acceptable to the sending and receiving processes, based on defined information flow control rules from an external information flow control database 1016 at block 1006. Based on the information control rules from the database 916, then various types of ensuring occurs at block 1014: ensuring data privacy in the external environment, ensuring data integrity in the external environment, ensuring trusted channel in the external environment and ensuring trusted path in the external environment.

Then, the request is imported into the sure domain at block 1020, based on the flow control rules from database 1016 (again) and internal flow control rules from internal IFC database 1018. An authentication occurs at block 1022 where the requestor is identified and authenticated using a credentials subsystem and an access control subsystem with information from a credential status database 1024 and a credential store database 1026. While the credentials store database 1026 provides a listing of authorized users, the credentials status database 1024 may indicated that certain credentials are not valid during certain periods or after a period of inactivity; in some circumstances these two databases may be combined into a single database. Access control decisions are made at block 1028 using access control subsystem and information from the credentials store 1026, a credential attributes and privileged database 1029, access rules database 1030 and a permissions database 1031 (again, it may be possible to combine the databases and the functions from multiple databases, if desired).

Next, at block 1033, the external identity is assigned an alias identity for use within the secure domain (which may be used to increase privacy or for domain separation reasons, as defined in the Common Criteria) and that alias identity is mapped using a mapped credentials store 1034 database with access control techniques and control passes to block 1035 where secure domain access control decisions are made using the mapped credential store 1034 and a credential attributes and privileges database 1036, a permissions database 1048 and a rules database 1040. This block 1035 performs access control within the secure domain (the center section of the FIG. 10), determining whether the requestor has been authorized to invoke the second tier gateway process. If so, at block 1042 user/subject binding is enabled using access control, then the process interface is invoked at block 1044 and the gateway is invoked at block 1046. Next, at block 1048, a session state is maintained or established (if it has not already been established) and, using access control, session information cache is established at database 1049. Next, a request flows across internal domain at block 1050 using the information control subsystem and an internal information flow control rules database 1052 and at block 1053 the step of ensuring the internal environment occurs. This ensuring step includes ensuring data privacy in the internal environment, ensuring data integrity in the internal environment, ensuring a trusted channel in the internal environment and ensuring a trusted path in the internal environment. This has the effect of flowing a request across the secure domain into the restricted domain with information flow control rules defined for the restricted domain being applied.

As can be seen, each domain may have its own rules for access and those rules can become increasingly more strict. The external domain may be the Internet where anyone can send and receive messages and there may be little, if any, restriction on the use of the data and little, if any, protection for it, so data must be either hidden (using some sort of data hiding techniques) or encryption to insure privacy. If data security is the concern (that the data not be tampered with), some sort of data integrity routines (like hashing techniques) could be used. The secure domain may have restrictions on who can enter and what can be done (some data may be read only to some users and processes). The restricted domain will generally have a higher level of restrictions or information flow control rules.

In this case, a request which complies with the information flow control rules established for the restricted domain enters at block 1054 and is compared with the information flow control rules database 1056 for the restricted domain. Authentication occurs at block 1058, using the status store database 1060 and the credentials store database 1062. Then, at block 1064, access control is determined using credential attributes and privileges database 1066, access control rules database 1068 and object permissions database 1070, using access control principles as discussed in connection with the access control subsystem. Access control operates to enable user/subject binding at block 1072, invoke process interface at block 1074 and to create/maintain state at block 1076. Also, a business process is invoked (or alternatively, not invoked) at block 1078 based on access control information from the preceding steps and session information is logged on session information cache 1080.

The foregoing example of FIG. 10 demonstrates how the various security processes can be specified at domain boundaries and how external and internal identities can be isolated for privacy and/or greater assurance.

Throughout this document, and in particular in connection with the description of FIGS. 9 and 10, reference has been made to "database". When this term is used, it is used in a broad and encompassing sense to represent information stored in a data processing system in a systematic manner for reference and retrieval. While such a storage in a data processing system would include a traditional database, it would not be limited to a narrow definition of a database but is meant to also include other storage systems including a configuration table, a list in memory or what might be referred to as a repository. Such systems might also sometimes be referred to as a library or a digital library or an index.

Of course, many modifications of the present invention will be apparent to those skilled in the relevant art in view of the foregoing description of the preferred embodiment, taken together with the accompanying drawings. For example, the present invention is not limited to the particular lines of demarcation between various security subsystems and, in practice, the security functions may be separated into fewer or more subsystems as the situation dictates. In some cases, one or more of the functions may be omitted or combined with other functions. For example, a given IT solution may reference some of all of the subsystems, depending on the function of the solution or the security protections requested. A particular IT solution may not have a Credentials Subsystem as described in connection with FIG. 8 owing to the fact that the forms of identification used in connection with the IT function are provided by something external to the IT solution. Some of the features and elements of the present invention may be useful without the corresponding use of other features and elements. By illustration, a Credentials Subsystem which is defined through the use of a biometric form of identity may not, in itself, specify the requirement to generate and distribute the credential (e.g., a fingerprint or voice print of the enrollee) as does the public key system; however, such a Credential Subsystem may fully integrate with an Access Control Subsystem which is designed to support identification, authentication and authorization based on biometric parameters. Additionally, many modifications can be made to the system implementation and the method of implementing security in an IT solution. To illustrate a representative modification, in order to maintain viability of the method, it may be necessary to add or modify notation, terminology, models, flows, use cases, etc. related to the method. These notations, terminologies, models, flows, use cases, etc. related to the ability to execute the method, represent the output of the method, integrate the output of the method into architectures involving other technologies (such as networks, applications, etc.) and visualize and identify solutions which incorporate the method. Accordingly, the foregoing description of the preferred embodiment should be considered as merely illustrative of the principles of the present invention and not in limitation thereof.

The invention claimed is:

1. A computer implemented method of designing security for an information technology system which includes insecure components, the steps of the method comprising:
    documenting a solution environment and a plurality of security assumptions using one or more computer-implemented design tools;
    identifying, documenting and ranking one or more security threats to the solution environment;
    determining one or more security properties of a single integrated security system comprising a plurality of interconnected and interdependent security subsystems that, inter alia, manage audits, integrity, and information flow control, and
    the subsystem that manages integrity further comprises:
        a confirming element to confirm hardware and software components and data integrity;
        a monitoring element to monitor hardware and software component reliability;
        a verification element to verify correct operation;
        a separation element to ensure domain separation;
        a first clock to maintain trusted time;
        and a second clock to provide current trusted time;
    assigning functional details of the plurality of interconnected and interdependent security subsystems to an infrastructure, a plurality of components, and a plurality of operations of the solution environment;
    enumerating security requirements for each of the infrastructure, components and operations of the solution environment;
    developing integrity assurance requirements for the solution environment;
    documenting the security requirements and the rationale for the solution environment; and
    providing and documenting guidance for selection of the plurality of components, for integrating the plurality of interconnected and interdependent security subsystems, and operating the solution environment.

2. The method of claim 1 wherein the step of identifying, documenting and ranking one or more security threats to the solution environment further comprises contrasting a normal process flow of a trusted environment with a peril process flow having conditions or exceptions of the normal process flow.

3. The computer implemented method of designing security into an information technology system of claim 1 wherein the step of determining one or more security properties of the interconnected and interdependent subsystems that manages audits further comprises designing the capability to initiate an audit, collect audit data, analyze audit data, request a trusted time, archive audit data, and sign and timestamp audit data, generate an audit report, and signal anomaly events of the solution environment.

4. The computer implemented method of designing security into an information technology system of claim 1 wherein the interconnected and interdependent subsystem that manages integrity further has the capability to request a trusted time, receive input of a time-based integrity event, signal an integrity system anomaly, and request an audit of the subsystem that manages integrity.

5. The computer implemented method of securing a solution including the steps of claim 1 wherein the step of determining the security properties of the overall system includes the step of using standard criteria for evaluating the solution.

6. The computer implemented method of securing a solution including the steps of claim 5 wherein the step of determining the security properties of the overall system includes the step of using the Common Criteria of ISO Standard 15408.

7. The computer implemented method of securing a system including the steps of claim 1 wherein the step of enumerating security requirements for infrastructure, components and operations includes the step of using an industry standard security criteria.

8. The computer implemented method of securing a system including the steps of claim 7 wherein the step of using an industry standard security criteria includes the step of using Common Criteria which conforms to ISO Standard 15408.

9. The computer implemented method of designing security into an information technology system of claim 1 wherein the interconnected and interdependent subsystem that manages information control further comprises an element that identifies and authenticates an origin/recipient of information control, obtains the identifier/identity of the origin/recipient, and checks the validity of the identifier/identity.

10. The computer implemented method of designing security into an information technology system of claim 9 wherein the interconnected and interdependent subsystem that manages information control further comprises an element that checks one or more rules of information flow control rules, and decides to enable or reject the information flow request.

11. The computer implemented method of designing security into an information technology system of claim 10 wherein the interconnected and interdependent subsystem that manages information control further enables the information flow request, applies information flow control mechanisms, activate information flow and protection activities, invoke and information flow interface and generate information flow audit data.

12. The computer implemented method of designing security into an information technology system of claim 11 wherein the information flow and protection activities are selected from the group comprising: data integrity, privacy, trusted path, trusted channel, proof of origin, proof of receipt, security attributes, immovability, domain crossings, static validation, and content scan/filters.

13. The computer implemented method of designing security into an information technology system of claim 1 further comprising using a systems integration system and method that provide in a first phase, the security reference model is used to address a plurality of security requirements of the information technology system; in a second phase, the security reference model is utilized to create a solution environment which specifically addresses security requirements within the solution environment; and in a third phase, a plurality of processes of the interconnected and interdependent security subsystems are measured, monitored and controlled based upon the security reference model.

* * * * *